United States Patent [19]

Wood

[11] Patent Number: 4,591,182

[45] Date of Patent: May 27, 1986

[54] RECLINER WHEELCHAIR

[76] Inventor: Francis W. Wood, Rte. 1 Box 76, Weyer's Cave, Va. 24486

[21] Appl. No.: 606,294

[22] Filed: May 2, 1984

[51] Int. Cl.[4] .............................................. B62M 1/14

[52] U.S. Cl. ............................ 280/647; 280/242 WC; 297/89; 297/DIG. 4

[58] Field of Search ............... 280/647, 650, 242 WC, 280/657; 297/DIG. 4, 88, 89, 83, 84

[56] References Cited

U.S. PATENT DOCUMENTS

| | | | |
|---|---|---|---|
| 1,204,785 | 11/1916 | Kindel | 297/83 |
| 2,694,437 | 11/1954 | Glaser | 297/83 |
| 3,282,626 | 11/1966 | Hampton | 297/89 |
| 3,937,490 | 2/1976 | Nasr | 280/242 WC |
| 4,362,311 | 12/1982 | Bergman | 280/242 WC |

*Primary Examiner*—John J. Love
*Assistant Examiner*—Joseph G. McCarthy
*Attorney, Agent, or Firm*—Penrose Lucas Albright

[57] ABSTRACT

A chassis in a wheelchair assembly interconnects forward large wheels having hand rims and a reclining chair via a recliner mechanism and supports side panels for the assembly. Rear caster wheels are connected to the rear of the side panels. The occupant of the wheelchair normally has his center of gravity centered between the forward and rear wheels. The chassis has an H-configuration as seen in plan. An underlying transverse tube of rectangular cross-section is welded to the undersides of two square cross-section tubes extending in the usual direction of travel of the wheelchair. One-half inch thick bars are welded to the transverse bar and inclined upwardly therefrom for mounting the axles for the large wheels. A horizontal brace is welded between the inclined bars and the upper aspects of the tubes of rectangular cross-section to provide an extremely strong and rigid all welded, all steel chassis.

17 Claims, 6 Drawing Figures

RECLINER WHEELCHAIR

BACKGROUND OF THE INVENTION

It is fatiguing for a person confined to a wheelchair to sit continuously in the same position. Both rest and relief can be obtained by the change of posture that occurs when the chair is tilted backward. For this reason, wheelchairs have been designed which permit the occupant to change the disposition of the seat by tilting same backward or forward and also be raising or lowering the leg rests. Examples of the prior art in this respect are disclosed in the following U.S. Pat. Nos. 3,147,039 to P. Smith et al of Sept. 1, 1964; 3,198,575 to H. Hawkins of Aug. 3, 1965; 3,269,768 to J. Kinney of Aug. 30, 1966; 3,284,126 to S. Piazza of Nov. 8, 1966; 3,640,566 to G. Hodge of Feb. 8, 1972; and 3,858,938 to O. Kristensson et al of Nov. 28, 1972.

Wheelchairs of the type involved must be rugged, relatively light in weight, easily manipulated by the occupant or an attendant and the reclining seat or chair therein should be as convenient to adjust as non-mobile chairs of the same type. To achieve these objects, prior art wheelchairs of the type involved have, in general, utilized frames which support both the wheels and the seat components wherein the frame usually extends on each side above the seat which depends therefrom or is otherwise supported by the frame. Such wheelchairs must either have the two opposite sides of the frame connected by a truss-like structure or utilize other means for rigidizing same; otherwise they tend to develop a side-to-side wobble especially after continued use. Although this is correctible by known mechanisms such as trusses or the like for stiffening and rigidizing the structure, the resulting composite wheelchair is frequently heavier than desirable in comparison with wheelchairs not having reclining seats whereby rigidity of the frame is more easily facilitated.

The instant invention is directed to a wheelchair structure wherein the seat is of a reclining type and which, at the same time, does not differ significantly in overall weight from nonreclining types of wheelchairs and which is, moreover, a highly rigid and wobble-resistant structure.

SUMMARY OF THE INVENTION

The instant invention thus relates to an improvement in wheelchair structure wherein the chair can be optionally reclined by the occupant and which is rugged in construction, relatively light in weight and provides to the occupant essentially the same conveniences as a non-mobile reclining chair. This is achieved by use of a relatively small but nevertheless highly rigid chassis which supports the chair's larger wheels, the reclining mechanism for the seat as well as the seat itself and which is, in much the same manner as an automobile chassis, contained in roughly the same horizontal plane. Such chassis also supports the side arm panels which, in turn, provide support for rear caster wheels. The center of gravity of the occupant is thus normally between the wheels and the structure is, in effect, constructed around the chassis which, as seen in plan, is H-shaped and is of an all welded construction. The forward rods which receive the large wheel axles are inclined upwardly from a lower transverse bar to which is welded two horizontal beams. A brace welded to the top part of the horizontal beams and the forward upwardly inclined rod serve to stiffen and provide an extremely rigid structure whereby side wobble of the large wheelchair wheels is practically nonexistent. The wheelchair assembly structure is not only relatively light of weight but is also easy to manufacture and costs less, requires less maintenance and is easier to repair than comparable wheelchairs. For the occupant, it operates generally more efficiently and effectively than wheelchairs of the same type particularly when used by the occupant in his home or otherwise on the same level.

These and other objects, adaptabilities and capabilities of the invention will be appreciated from the following description of the invention, reference being had to the accompanying drawings, in which:

DESCRIPTION OF THE PREFERRED EMBODIMENT

Figure 3:
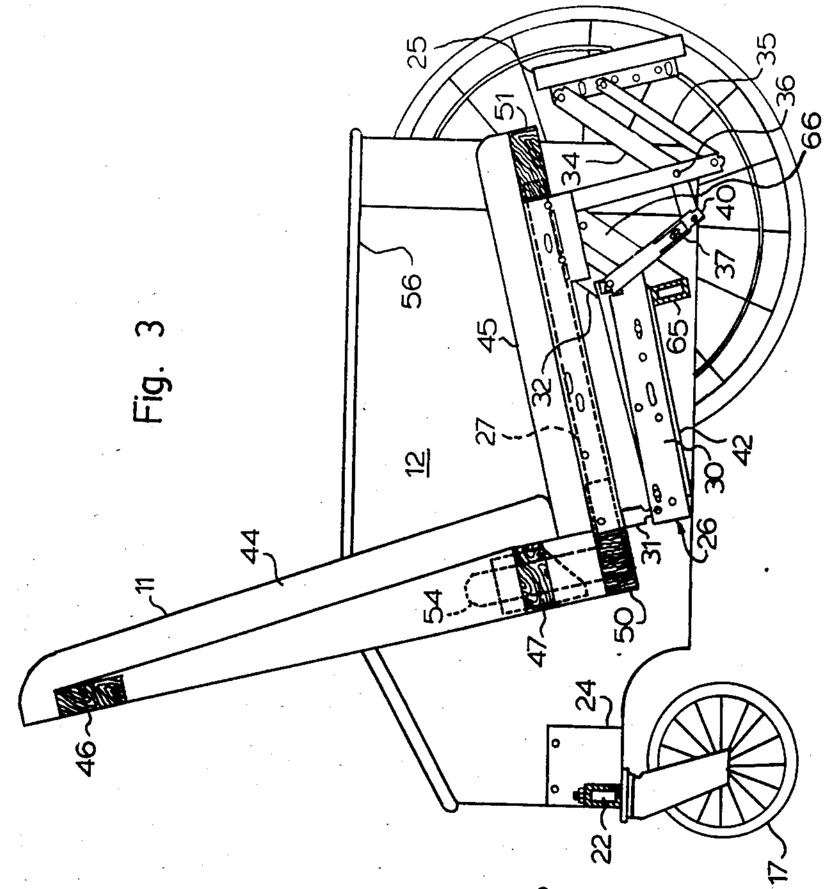
FIG. 3 is a side sectional view of the wheelchair taken on 3—3 of FIG. 2.
Figure 1:
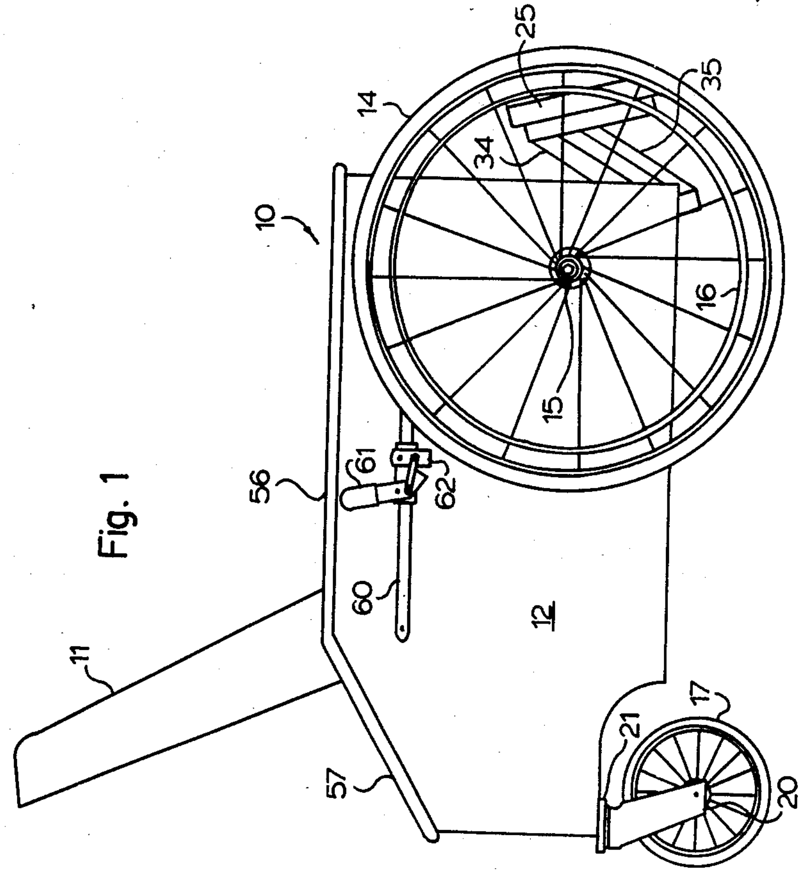
FIG. 1 a side elevation of a wheelchair in accordance with the invention.
Figure 2:
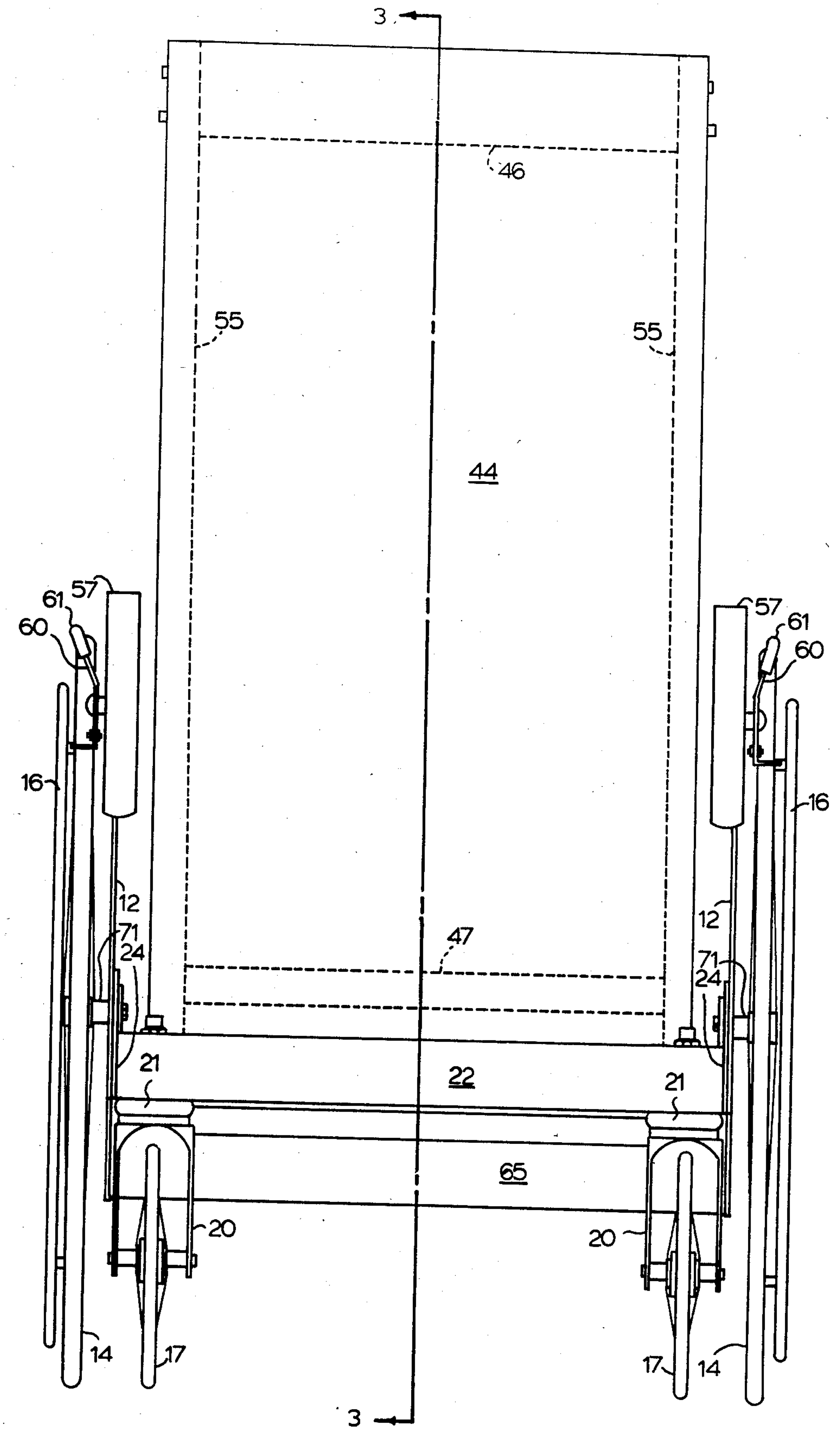
FIG. 2 is a rear elevation of the wheelchair shown in FIG. 1.

Referring now to FIGS. 1–3, the wheelchair is indicated generally by reference numeral 10 and comprises a reclining chair 11, a side arm panel 12, a relatively large (twenty-four inch) laced wheel 14 with a hub 15 and a circular hand rim 16. A similar wheel is on the opposite side of the chair 10 and this is also true with respect to the rear relatively small (eight inch diameter) caster wheel 17 supported by a fork wheel holder 20 on a swivel connection 21 which is mounted on a rear wheel support beam 22 rigidly connected to a pair of rear wheel plate supports 24, such supports 24 being bolted or otherwise secured to the inboard sides of side panels 12. A padded front leg support 25 is mounted on a pair of recliner mechanisms 26. Recliner mechanisms 26 are designed for two-way, low-leg rocker recliner construction. Each comprises an upper bar 27 pivotably connected to a lower sliding bar assemblage 30 by pivot links 31 and 32 whereby upper bar 27 can be moved by the occupant relative to the lower bar assemblage 30. The foot support 25 is supported by two generally V shaped linkages 34 and 35, each having two link parts pivotable relative to each other. Linkage 34 pivotally connects lower bar assemblage 30 to support 25 and linkage 35 pivotally connects the upper bar 27 to support 25, such linkages being pivotally connected at pivot 36 and the after part of linkage 34 having an elongated slot 37 and two parts connected by a pin 40 so as to be extensible for about one inch.

Recliner mechanisms 26 are known and comparable recliner mechanisms may be substituted wherein the lower bar assemblage 30 is rigidly connected to the inboard side of a rear hollow beam 42 which slopes upwardly towards the front of the chair.

Reclining chair 11 has an upholstered back 44 and an upholstered seat 45, such back and seat having about two inches of padding and underlying springs. Back 44 includes a horizontal wooden upper beam 46 and a lower wooden horizontal beam 47. Seat 45 includes two lower horizontal beams 50 and 51 which are connected to two spaced-apart wooden side beams (not shown).

Back 44 and seat 45 are connected together by a pair of corner brackets 54 which connect the side beams of seat 45 and two vertical beams 55 of back 44 to which are connected the horizontal beams 46 and 47 to form a rectangular framework for receiving the upholstery and springs of back 44. The connection of back 44 to corner bracket 54 may, if desired, be by means of a slot formed in a bracket plate attached to vertical beams 55. The side panels 12 are preferably composed of one-half inch plywood and have glued or otherwise secured thereto a top side panel trim 56 and a side angle panel trim 57 which also may function as armrests or gripping means for an attendant who is pushing the wheelchair from the rear. Trim components 56 and 57 are preferably composed of pine, have a one-half inch slot to receive the upper part of the panel 12 and are about three inches in width. A wheel brake 60 which includes a wheel brake handle 61 and a wheel contacting part 62 is bolted to the right panel 12 and is of known construction. A similar brake 60 is also bolted to the left panel 12.

Figure 5:
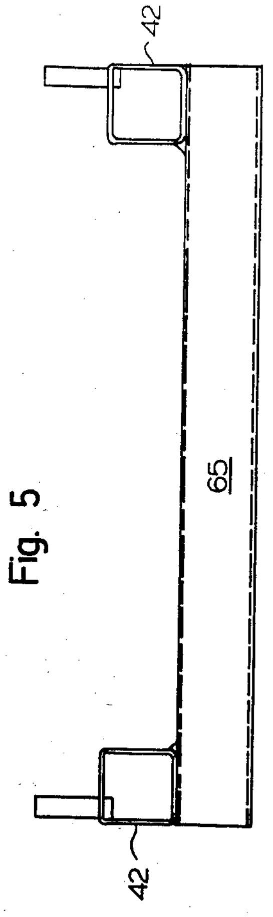
FIG. 5 is a rear elevation view of such chassis.
Figure 6:
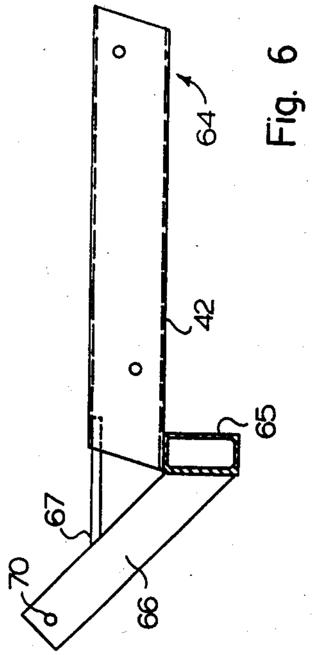
FIG. 6 is a side elevation view of the chassis.
Figure 4:
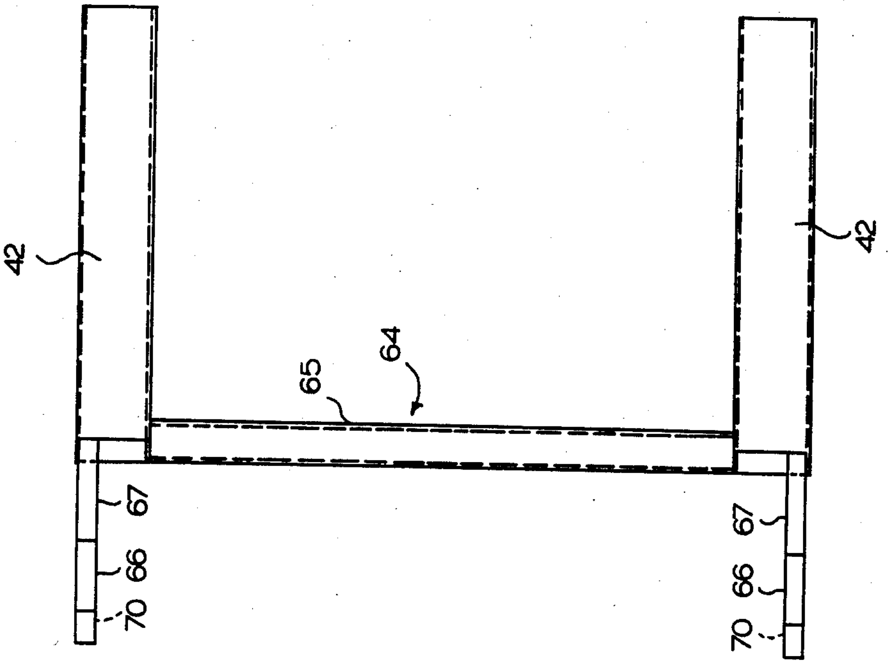
FIG. 4 is a plan view of the chassis of the wheelchair.

Referring now to FIGS. 4–6, the rigid chassis indicated by reference numeral 64 comprises a transverse hollow bar or beam 65 of rectangular cross section to which is welded horizontal beams 42 having square cross sections. A recliner mechanism as shown in FIG. 3 is bolted to each beam 42. Also welded to horizontal beam 65 and inclined forwardly upwardly are a pair of spaced apart flat iron bars 66 which are one-half inch thick.

A pair of spaced apart braces 67 are welded to extend between the upper parts of beams 42 to the rods 66 whereby the chassis 64 is an all welded extremely rigid structure. The hub 15 of each wheel 14 contains ball-bearings and receive an axle 71 which is also received by the rods 66 are secured thereto at openings 70 therein.

It will be noted that as seen in plan in FIG. 4, chassis 64 has the configuration of a "H" with a forwardly extending legs 66 and the rearwardly extending horizontal legs 42. The side panels 12 are bolted to the outboard sides of legs or beams 42 and, as indicated above, a recliner mechanism 26 is bolted to the inboard side of such beams. The wheels 14 are supported via axles 71 which are securely bolted to the forward upwardly inclined legs or rods 66 via openings 70. This provides an extremely strong structure.

When the occupant desires to tip himself to the rear, he merely pushes against the top side trim 56 wherein the linkage of mechanism 26 causes the reclining chair, seat 45 and back 44 to tilt to the rear and at the same time, causes the leg support 25 to raise. In this respect, bar 37 moves to the rear relative to assemblage 30, links 30 and 31 turn counterclockwise as seen in FIG. 3. Linkage 35 pivots around pivot 36 to increase the angle between the link parts of linkage 35 and support 25 becomes horizontal. Such position of the chair is retained by friction until the occupant desires to change same by, for example, pulling himself forward whereby the reclining chair 11 assumes the position shown in FIGS. 1 and 3. The occupant can maneuver by gripping the circular hand rims 16 and moving the wheels 14 as desired. Due to the location of the rear wheels 17, it is practically impossible for the occupant to cause the wheelchair 10 to tip over in any direction. Thus the chair is extremely safe and this safety is augmented by the existence of the brakes 60.

Although a preferred embodiment of the my invention is described above, it is to be understood that it is capable of other adaptations and modifications within the scope of the appended claims. The chassis 64 is preferably an all welded steel construction but other high strength materials may also be used. If desired, the transverse bar 65 may be augmented by diagonal bars to produce a truss arrangement between the horizontal beams 42. Alternatively, an equivalent truss beam structure may be substituted. Also, as indicated above, other types of recliner hardware may be utilized instead of the mechanism 26 disclosed herein. This may include means to modify the angle between back 44 and seat 45. The recliner mechanism, corner brackets, wheels and wheel brakes are commercially available. The drawings are reasonably to scale. Elements in the claims should be construed to cover corresponding structure disclosed in the specification and drawings and equivalents thereof.

Having disclosed my invention, what I claim as new and to be secured by Letters Patents of the United States is:

1. A wheelchair which comprises a reclining chair mounted on a recliner mechanism, a relatively large wheel on each side of said chair, each said wheel including axle means, a rigid chassis which is of "H" configuration as seen in plan and is so constructed and arranged that two of its legs are inclined forwardly and upwardly and carry said axle means and the other two of its legs are horizontal and carry said recliner mechanism, a brace being provided between each said upwardly inclined leg and the corresponding said horizontal leg, said horizontal leg being rigidly connected on their undersides to a transverse bar and said upwardly inclined legs being connected to the forward side of said bar at their rear ends, side arm panels being mounted on the outboard sides of said horizontal legs and said recliner mechanism being connected to the inboard sides of said horizontal legs.

2. A wheelchair in accordance with claim 1 wherein said horizontal legs comprise hollow beams having a rectangular cross section.

3. A wheelchair in accordance with claim 2 wherein said transverse horizontal bar comprises a hollow beam having a rectangular cross section.

4. A wheelchair in accordance with claim 1 wherein caster wheels are provided at the rear of respective said side panels.

5. A wheelchair in accordance with claim 4 wherein wheel brakes are mounted on respective sides of said side panels in a manner selectively to bear against each said large wheel.

6. A wheelchair in accordance with claim 1 wherein said large wheel includes a large circular hand rim.

7. A wheelchair in accordance with claim 1 wherein said chassis is an all welded construction.

8. A wheelchair assembly comprising in combination:

a reclining chair mounted on a recliner mechanism;

a pair of relatively large wheels including hand rims connected thereto and axle means for said wheels;

a chassis comprising a pair of spaced apart horizontal beams extending in the wheelchair's normal direction of travel connected by a transverse beam which extends under and is rigidly secured to said horizontal beams and to a pair of upwardly inclined rods extending away from said horizontal beams and rigidly connected thereto by generally horizontal braces, the upper forward aspect of each said rod mounting said axle means.

9. A wheelchair assembly in accordance with claim 8 wherein said horizontal beams have a rectangular cross section, said recliner mechanism being mounted on the inboard sides of said horizontal beams and side arm panels being mounted on the outboard sides of said horizontal beams.

10. A wheelchair assembly in accordance with claim 8 wherein at least one relatively small caster wheel is mounted in the wheelchair assembly to the rear of said relatively large wheels.

11. A wheelchair assembly in accordance with claim 9 wherein there are two said caster wheels which are mounted on respective side arm panels at their rearward aspects and to the rear of the center of gravity of an occupant sitting normally in said reclining chair.

12. A wheelchair assembly in accordance with claim 11 wherein said recliner mechanism is connected to a leg support, said leg support being movable by said recliner mechanism relative to said chair.

13. A wheelchair assembly comprising in combination:

a reclining chair including a pair of recliner mechanisms which are connected to a seat, back support and leg support of said chair and are adapted to permit the adjustment of the relative positions of said seat, back support and leg support from a sitting position to a reclining position and to intermediate positions;

a pair of large wheels with a hand rim attached to each said wheel, and axle means for each of said wheels;

a chassis interconnected to said chair and said wheels which includes a pair of horizontal side support beams, one said recliner mechanism being mounted on a corresponding said side support beam, a transverse beam included in said chassis rigidly connected to said side support beams, a pair of upwardly inclined rods which are each rigidly connected to said transverse beam at opposite ends thereof, and a support brace rigidly connecting each said side support beam to a corresponding said rod, each said rod including means receiving said axle means;

a pair of side arm panels mounted on said chassis; and at least one relatively small wheel mounted in the wheelchair assembly to the rear of said large wheels.

14. A wheelchair assembly in accordance with claim 13 wherein said side support beams and said transverse beam have rectangular cross-sections.

15. A wheelchair assembly in accordance with claim 13 comprising a further small wheel similar to the aforementioned said small wheel, both such small wheels being caster wheels and being mounted on the rear of respective said side arm panels.

16. A wheelchair assembly in accordance with claim 15 wherein the center of gravity of an occupant sitting in a normal manner in said chair is approximately centered between said large wheels and said caster wheels.

17. A wheelchair assembly in accordance with claim 13 wherein said chassis has a configuration of a "H" as seen in plan.

* * * * *